United States Patent
Martinez et al.

(10) Patent No.: US 12,554,137 B2
(45) Date of Patent: Feb. 17, 2026

(54) FREEFORM POLARIZATION LIGHTGUIDE

(71) Applicant: GOOGLE LLC, Mountain View, CA (US)

(72) Inventors: Oscar Alberto Martinez, Mountain View, CA (US); Yi Qin, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 527 days.

(21) Appl. No.: 18/009,394

(22) PCT Filed: Jun. 30, 2020

(86) PCT No.: PCT/US2020/040302
§ 371 (c)(1),
(2) Date: Dec. 9, 2022

(87) PCT Pub. No.: WO2022/005457
PCT Pub. Date: Jan. 6, 2022

(65) Prior Publication Data
US 2023/0236423 A1 Jul. 27, 2023

(51) Int. Cl.
*G02B 27/01* (2006.01)
(52) U.S. Cl.
CPC .... *G02B 27/0172* (2013.01); *G02B 2027/013* (2013.01); *G02B 2027/0178* (2013.01); *G02B 2027/0194* (2013.01)
(58) Field of Classification Search
CPC .................................................. G02B 27/0172
See application file for complete search history.

(56) References Cited

U.S. PATENT DOCUMENTS

| | | |
|---|---|---|
| 6,331,916 B1 | 12/2001 | Mukawa |
| 9,389,422 B1 | 7/2016 | Cakmakci et al. |
| 2003/0151705 A1 | 8/2003 | Saiki et al. |
| 2012/0162549 A1 | 6/2012 | Gao et al. |
| 2015/0062716 A1 | 3/2015 | Komatsu et al. |
| 2015/0177519 A1 | 6/2015 | Cakmakci et al. |

(Continued)

FOREIGN PATENT DOCUMENTS

| | | |
|---|---|---|
| CN | 109313351 A | 2/2019 |
| CN | 110651206 A | 1/2020 |
| TW | 202011080 A | 3/2020 |

OTHER PUBLICATIONS

International Search Report and Written Opinion mailed Mar. 23, 2021 for corresponding International Application No. PCT/US2020/040302, 12 pages.

(Continued)

*Primary Examiner* — Edmond C Lau (57) ABSTRACT

An optical device includes a freeform lightguide to direct light from a display to a region where a user's eye is expected to be positioned. The freeform lightguide includes a lightguide substrate with first and second opposing surfaces extending between a first end and a second end of the freeform lightguide, with at least the second surface being a freeform surface and being overlaid with a partial mirror layer. The first surface being overlaid with at least a quarter-wave plate layer and a polarization beam splitter layer. The freeform lightguide also includes an in-coupling interface proximate to the first end of the freeform lightguide to receive light from the display.

20 Claims, 7 Drawing Sheets

(56) References Cited

U.S. PATENT DOCUMENTS

| | | | |
|---|---|---|---|
| 2016/0320559 A1* | 11/2016 | Richards | G02B 6/32 |
| 2018/0004002 A1 | 1/2018 | Rong et al. | |
| 2018/0039052 A1* | 2/2018 | Khan | G02B 17/0856 |
| 2019/0285902 A1* | 9/2019 | Ouderkirk | G02B 27/0955 |
| 2020/0041790 A1 | 2/2020 | Martinez et al. | |

OTHER PUBLICATIONS

International Preliminary Report on Patentability mailed Jan. 12, 2023 for PCT Application No. PCT/US2020/040302, 7 pages.
Translation of Japanese Notice of Grounds of Rejection mailed Apr. 9, 2024 for JP Application No. 2022-580880, 10 pages.
Summarized Translation of Chinese Office Action mailed Apr. 17, 2025 for CN Application No. 202080101912.1, 25 pages.
Translation of Korean Notice of Allowance mailed May 13, 2025 for KR Application No. 1020227044077, 4 pages.
Communication under Rule 71(3) EPC mailed Aug. 4, 2025 for EP Application No. 20740776.8, 43 pages.

\* cited by examiner

FREEFORM POLARIZATION LIGHTGUIDE

CROSS-REFERENCE TO RELATED APPLICATIONS

The present application is a U.S. National Stage under 35 U.S.C. § 371 of International Patent Application Serial No. PCT/US2020/040302, entitled "FREEFORM POLARIZATION LIGHTGUIDE" and filed on Jun. 30, 2020, the entirety of which is incorporated by reference herein.

BACKGROUND

A conventional head-mounted display that provides augmented reality (AR) experiences typically employs an optics system that both permits a user to view the surrounding environment through the optics system as well as to transmit display light representative of AR visual content to one or both eyes of the user. Such optics systems typically employ a lightguide (also commonly referred to as a "waveguide") to convey the display light from the display while also permitting light from the surrounding environment to pass through to the user's eyes. Conventional lightguides rely on total internal reflection (TIR) of light provided by the display entirely from input to output, which is dependent upon light within the lightguide being reflected at a critical angle. To achieve TIR with a wide field of view (FOV), such lightguides must be composed of a material with a high index of refraction. Moreover, lightguide materials with higher indices of refraction tend to be both heavier and more expensive than materials with lower indices of refraction, and consequently, conventional TIR-based lightguides tend to be more expensive and heavier.

In addition, conventional lightguides require at least one extraction component embedded or implemented within the lightguide itself to cause the reflected light to propagate out of the lightguide, generally towards a user's eye, instead of continuing to be reflected within the lightguide. Such extraction components include, for example, raised or recessed surface features such as protrusions or dimples, as well as localized material variations or other surface or volume perturbations in the lightguide. These perturbations can cause a loss in extraction efficiency (e.g., loss in brightness uniformity of reflected light) and result in discontinuous surfaces which may be visible to a user or observer.

SUMMARY OF THE INVENTION

Embodiments relate to an apparatus comprising a freeform lightguide, which includes a lightguide substrate comprising first and second opposing surfaces extending between a first end and a second end of the freeform lightguide, wherein at least the second surface is a freeform surface; an in-coupling interface at least partially formed by the lightguide substrate (and thus being located proximate the first end of the lightguide or partially forming the first end of the lightguide); a quarter-wave plate layer overlying the first surface of the lightguide substrate; a polarization beam splitter layer overlying the quarter-wave plate layer; and a partial mirror layer overlying the second surface.

The apparatus may comprise a display configured to emit display light toward the in-coupling interface of the lightguide substrate. The apparatus may further comprise a quarter-wave plate disposed between the display and the in-coupling interface. Further, the display may be arranged in such a way relative to the in-coupling interface and/or the in-coupling interface may be orientated relative to the first or the second surface in such a way that display light from the display entering into lightguide at the in-coupling interface is directed to the first surface or the second surface.

Moreover, the display is configured to emit the display light having a first circularly polarized state; and/or the quarter-wave plate layer is configured to convert incident light having first circularly polarized state to light having a first linearly polarized state, to convert incident light having the first linearly polarized state to light having the first circularly polarized state, and to convert incident light having a second circularly polarized state to a second linearly polarized state; and/or the polarization beam splitter layer is configured to reflect light having the first linearly polarized state and to transmit light having the second linearly polarized state.

The apparatus also may comprise an eyeglass frame comprising an eyeglass lens; and wherein the eyeglass lens implements the freeform lightguide and an out-coupling region disposed at or adjacent to an eye-ward surface of the eyeglass lens.

The freeform lightguide further may comprise a linear polarization layer overlying the polarization beam splitter layer; and/or an anti-reflective layer overlying the linear polarization layer. Also, the apparatus may have a display quarter-wave plate disposed between the display and in-coupling interface and configured to convert the display light emitted from the display from a linearly polarized state to a circularly polarized state.

The partial mirror layer may be configured to convert reflected incident light having a first circularly polarized state to light having a second circularly polarized state; and/or convert reflected incident light having the second circularly polarized state to light having the first circularly polarized state.

The apparatus may further comprise a compensation optic disposed at the second surface of the lightguide. For example, the compensation optic is composed of a transparent material having properties allowing transmission of light through the compensation optic with minimal diffraction and/or reflection. An eye-facing surface of the compensation optic may have a freeform curvature that is complementary to the world-facing (second) surface of the lightguide. A profile width of the compensation optic can vary such that the world-facing surface of the compensation optic is parallel or near parallel to the eye-facing (first) surface of the lightguide. Furthermore, the world-facing surface of the compensation optic can be a surface capable of incorporating prescription optical correction of world-side light for a user.

Embodiments also relate to a method for conveying display light from a display to a user's eye in a near-eye display system, which includes providing a freeform lightguide comprising a lightguide substrate comprising first and second opposing surfaces and an in-coupling interface, a quarter-wave plate layer overlying the first surface, a polarization beam splitter layer overlying quarter-wave plate layer, and a partial mirror layer overlying the second surface, wherein at least the second surface comprises a freeform surface; directing display light emitted by a display to the in-coupling interface;

conveying a representation of the display light through the lightguide from the in-coupling interface to an out-coupling region; and transmitting the representation of the display light eye-ward from the out-coupling region following incident of the representation of the display light on the second surface.

The embodiments of the apparatus described above may also be used in embodiments of the above method. For example, the freeform lightguide may comprise a linear polarization layer overlying the polarization beam splitter layer.

Moreover, conveying the representation of the display light through the lightguide may comprise causing a first change to a polarization state of the display light such that the display light is reflected by the polarization beam splitter layer; and/or causing a second change to the polarization state of the reflected display light such that the display light passes through the quarter-wave plate layer, the polarization beam splitter layer, and the linear polarization layer, to the out-coupling region.

Further, conveying the representation of the display light through the lightguide may comprise at least one of the following actions: conveying the display light having a first circularly polarized state from the in-coupling interface to the quarter-wave plate layer; optionally converting the representation of the display light to a first linearly polarized state at the quarter-wave plate layer; optionally reflecting the representation of the display light having the first linearly polarized state from the first surface of the freeform lightguide toward the quarter-wave plate layer; and optionally converting the reflected representation of the display light from the first linearly polarized state to the first circularly polarized state at the quarter-wave plate layer.

Further, conveying the representation of the display light through the lightguide may comprise at least one of: conveying the representation of the display light having the first circularly polarized state from the quarter-wave plate layer to the second surface; optionally reflecting the representation of the display light from the partial mirror layer at the second surface such that the first circularly polarized state is converted to a second circularly polarized state; optionally conveying the representation of the display light having the second circularly polarized state to the quarter-wave plate; optionally converting the representation of the display light having the second circularly polarized state to a second linearly polarized state at the quarter-wave plate layer; optionally conveying the representation of the display light having the second linearly polarized state to the polarization beam splitter layer; and optionally reflecting the representation of the display light having the second linearly polarized state from the polarization beam splitter layer.

Also, conveying the representation of the display light through the lightguide may further comprise: conveying the representation of the display light having the second linearly polarized state from the polarization beam splitter layer to the quarter-wave plate layer; optionally converting the representation of the display light having the second linearly polarized state to the second circularly polarized state at the quarter-wave plate layer; optionally conveying the representation of the display light having the second circularly polarized state to the second surface; optionally reflecting the representation of the display light having the second circularly polarized state from the partial mirror layer of the second surface such that the display light is converted to the first circularly polarized state; and optionally conveying the representation of the display light having the first circularly polarized state through the quarter-wave plate layer, the polarization beam splitter layer, and the linear polarization layer, to the out-coupling region.

Of course, only a single action of the above examples regarding conveying the representation of the display light through the lightguide could be employed. Also, any combination of these actions might be used.

In another aspect, the invention relates to a near-eye display system comprising a freeform lightguide having an in-coupling interface and having an out-coupling region facing an expected position of a wearer's eye, the freeform lightguide configured to convey light incident at the in-coupling interface to the out-coupling region by inducing at least one change in a linearly polarized state of the light and at least one change in a circularly polarized state of the light as the light traverses the freeform lightguide using a film stack disposed at a first major surface facing the expected position of the wearer's eye and a partial mirror layer disposed at an opposing second major surface, wherein at least a portion of the changes in polarization states induce the light to reflect within the freeform lightguide.

The near-eye display system may be formed by the apparatus described above. For example, at least a portion of the changes in polarization states induce the light to reflect from a polarization beam splitter layer within the freeform lightguide.

Further, the lightguide may comprise a film stack comprising a quarter-wave plate layer; and/or a polarization beam splitter layer.

Moreover, the film stack may further comprise a linear polarization layer; and/or an anti-reflective layer. Also, at least a portion of the changes in polarization states may induce the light to pass through the film stack to the out-coupling region towards a user's eye.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

FIGS. 1-8 illustrate example implementations of a freeform polarization lightguide for use in a near-eye display system. In at least one embodiment, the near-eye display system uses the freeform polarization lightguide (FPLG) to convey light representative of display images from a micro-display or other display to a wearer's eye. However, unlike conventional lightguides that rely entirely on total internal reflection (TIR) to convey light through the lightguide, the FPLG does not rely entirely on TIR, but instead conveys a representation of the display light from an in-coupling interface of the FPLG facing the display to an out-coupling region facing a user's eye through multiple changes of the polarization state of the light as it traverses the FPLG, where at least some of these changes in the polarization state induce reflection of the light within the FPLG. In addition, in some embodiments, some of these changes in the polarization state permit the reflected light to traverse the layers of the FPLG that served to reflect the light when the light was in other polarization states, such that the light exits the FPLG at an out-coupling region towards a user's eye.

By manipulating the polarization state of the display light to facilitate reflection within the FPLG until the light is ultimately output eye-ward, the FPLG can convey the display light from the in-coupling interface to the out-coupling region in a manner that is not reliant on end-to-end TIR or extraction components, in contrast to conventional near-eye lightguides. As such, the lightguide substrate of the FPLG which serves as the primary conduit for the display light between in-coupling and out-coupling can be implemented using optically transparent material with a lower index of refraction than the lightguide material used in conventional TIR-based lightguides, while also providing a higher FOV than typically is achievable by such conventional lightguides for a material with a given index of refraction. Manufacturing complexity is also reduced because specific extraction components or materials are not required. Consequently, the FPLG can be lighter and less expensive to manufacture. Moreover, because end-to-end TIR is not required, the FPLG may be implemented with one or more major surfaces that do not have rigid radial dimensions. As an example, the FPLG may be implemented in a form factor with one or both major surfaces being freeform surfaces, and, as such, can be implemented to provide a non-zero optical power or implemented within an eyeglass lens fitted to an eyeglass frame and thus also provide prescriptive lensing.

Figure 1:
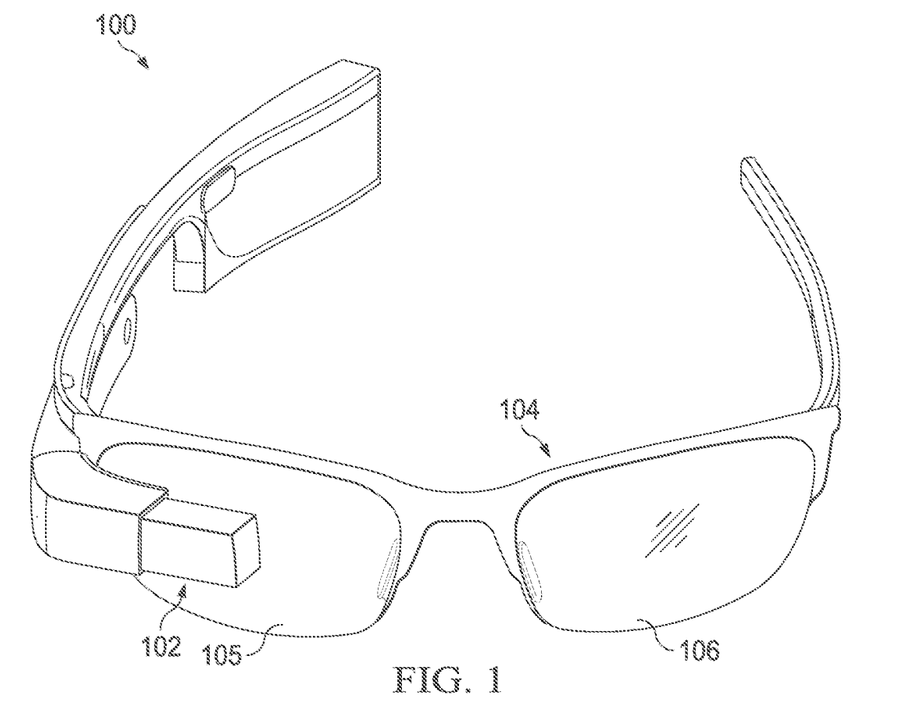
FIG. 1 is a front view of an example form factor for a near-eye display system employing a freeform polarization lightguide in accordance with some embodiments.

FIG. 1 illustrates an example near-eye display system 100 employing a freeform polarization lightguide (FPLG) 102 in accordance with at least one embodiment. The system 100 is implemented in an eyeglass form factor having an eyeglass frame 104 with eyeglass lenses 105, 106 for a wearer's right eye and left eye, respectively. In the depicted embodiment, the FPLG 102 is separate from the eyeglass lenses and instead overlies one of the eyeglass lenses (eyeglass lens 105 in this instance) such that an out-coupling region (described in greater detail below with reference to FIG. 3) of the FPLG 102 faces the expected position of the corresponding eye of the wearer. The FPLG 102 is mounted to the eyeglass frame 104 via a lightguide mount housing 109, which also serves to house some or all of the electronic components (not illustrated in FIG. 1) of the near-eye display system 100, such as a display that generates augmented reality (AR) or virtual reality (VR) imagery for display to the wearer via the FPLG 102, an in-coupling optic to direct light from the display to an in-coupling interface of the FPLG 102, one or more processors, wireless interfaces, batteries or other power sources, and the like. A number of these components are described in greater detail below.

Figure 2:
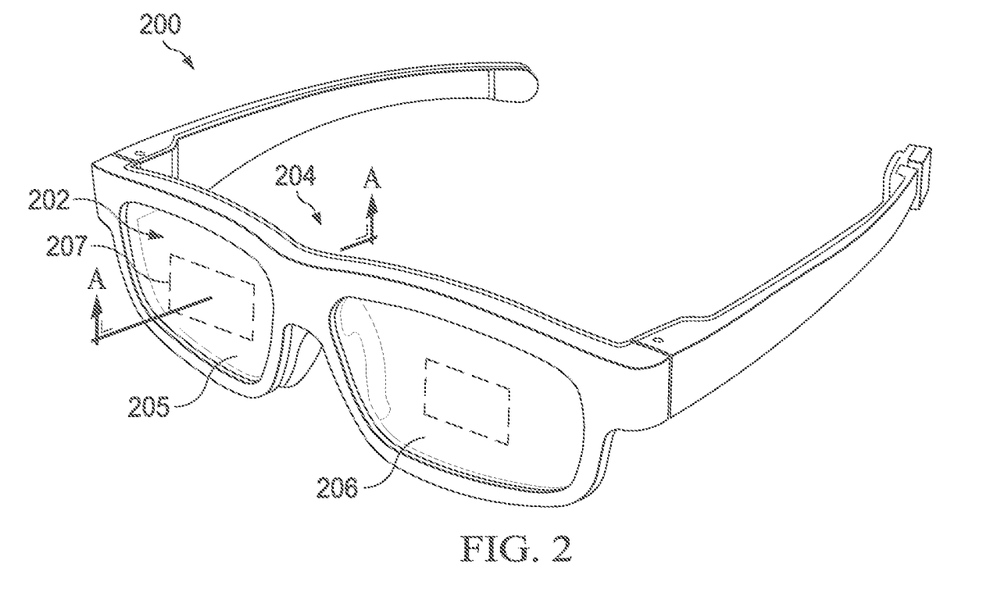
FIG. 2 is a perspective view of another example form factor for a near-eye display system employing a freeform polarization lightguide in accordance with some embodiments.

FIG. 2 illustrates another example near-eye display system 200 employing an FPLG 202 in accordance with at least one embodiment. As with the system 100 of FIG. 1, the system 200 employs an eyeglass form factor with an eyeglass frame 204 having eyeglass lenses 205, 206. However, in contrast with the system 100, the system 200 implements the FPLG 202 using the eyeglass lens 205. That is, the FPLG 202 is integrated within the eyeglass lens 205, and thus allowing the near-eye display system 200 to have a more traditional eyeglass appearance. In this implementation, a display housing (omitted from FIG. 2 for clarity of illustration) on the eyeglass frame 204 at the top of the eyeglass lens 205 contains a micro-display or other display to emit display light representative of AR or VR imagery and in-coupling optic to direct the emitted display light to an in-coupling interface of the FPLG 202 in the lens 205, whereupon the display light is propagated through the FPLG 202/eyeglass lens 205 toward an out-coupling region 207 that is located in the eyeglass lens 205/FPLG 202 so as to be aligned with an expected position (or expected range of positions) of a corresponding eye of the wearer. In some embodiments, the eyeglass lens 206 likewise implements a corresponding FPLG 202, and the system 200 employs corresponding display componentry, in the same manner, to provide for the display of AR or VR imagery to the other eye of the wearer as well.

The FPLG 102 of system 100 of FIG. 1 and the FPLG 202 of system 200 of FIG. 2 each operates to convey display light from a proximate display (e.g., a micro-display) to an eye of the user via multiple reflections of the display light within the body of the FPLG as the display light traverses from one end of the FPLG 202 proximate to the display to an out-coupling region of the FPLG 202 facing an eye of the wearer. However, unlike a conventional lightguide, some or all of these reflections do not rely on TIR. That is, the angle of incidence may be less than the critical angle of the interface between mediums at the point of reflection. Rather than relying on TIR, the FPLG 202 instead employs a stack of layers that selectively change the polarization state of incident display light or selectively reflect incident display light based on polarization state and thus causes the display light to reflect one or more times within the FPLG 202 until the polarization state of the display light is changed in a manner that permits the display light to transmit through the surface of the FPLG 202 at the out-coupling region 207 that faces the wearer's eye.

Figure 3:
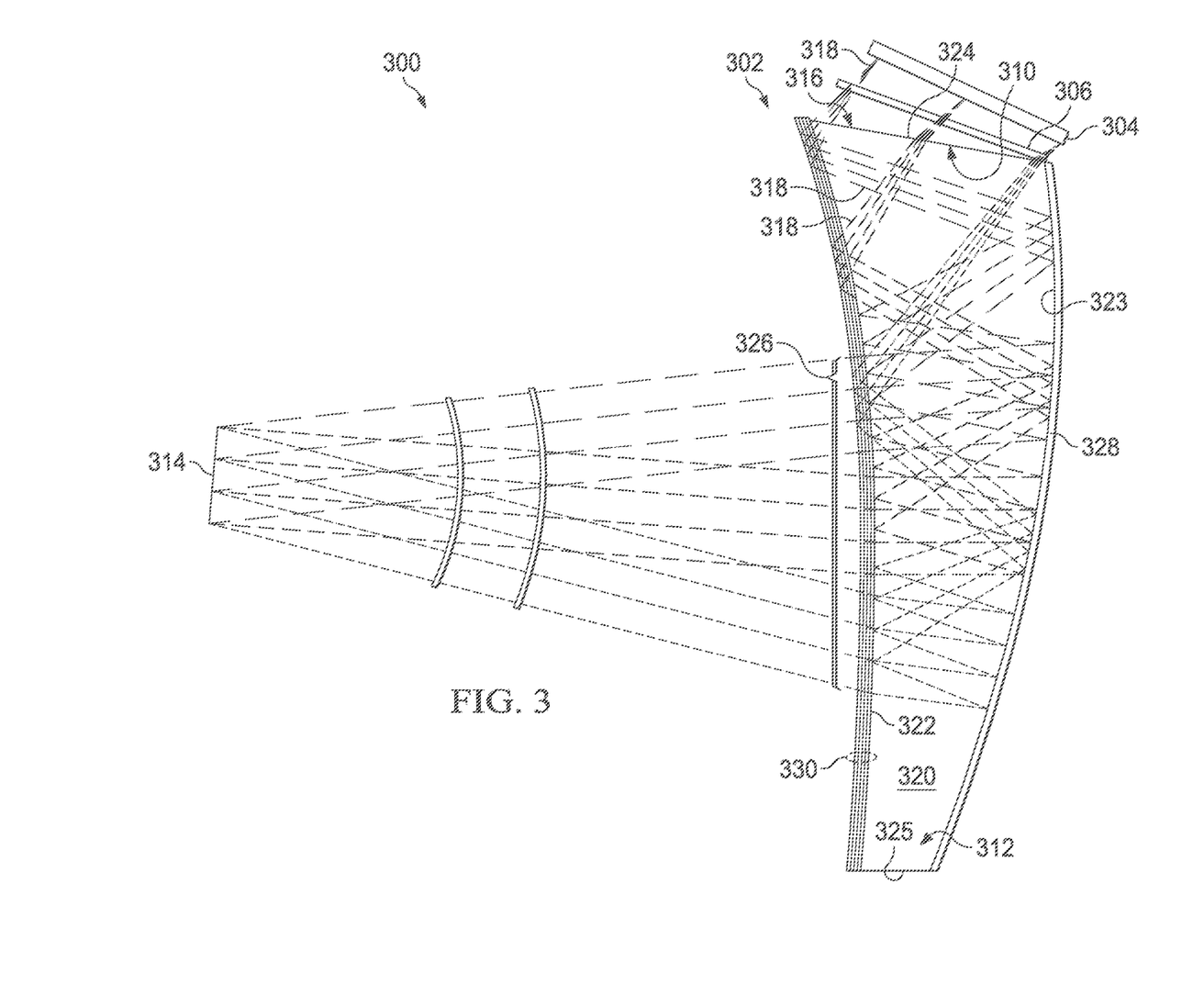
FIG. 3 is a cross-section view of a freeform polarization lightguide with associated display in accordance with some embodiments.

FIG. 3 illustrates a cross-section view 300 of an FPLG 302 that employs this manipulation of polarization states to provide internal reflection of in-coupled display light in accordance with at least one embodiment. The FPLG 302 represents, for example, the FPLG 202 of the system 200 and thus the cross-section view 300 can represent the cross-section A-A illustrated in FIG. 2. In other embodiments, the FPLG 302 represents the FPLG 102 of FIG. 1. It should be noted that the depicted dimensions of various features and angles of incidence depicted in FIG. 3 are for the purpose of illustrating the principles of operation and may not reflect actual dimensions or angles implemented within the FPLG.

The FPLG 302 (i.e. the apparatus or system the FPLG 302 forms part of) includes a display 304 that can comprise any of a variety of displays suitable for use in near-eye display systems employing lightguides, such as organic light-emitting diodes (OLED) or liquid crystal on silicon (LCOS) micro-displays. In implementations in which the display 304 is configured to emit light that is linearly polarized, the FPLG 302 (i.e. the apparatus or system the FPLG 302 forms part of) further includes a display quarter-wave plate 306 disposed between the display 304 and an in-coupling interface 316 of the FPLG 302 to convert the polarization of the linearly polarized display light to circularly polarized state before the display light enters into the FPLG 302.

The FPLG 302 is comprised of a lightguide substrate 320 that extends from a first end 310 proximate to the display 304 to an opposing second end 312 of the FPLG 302. The opposing ends 310, 312 of the FPLG 302 may be defined by corresponding ends of the substrate 320. The FPLG 302 also includes the in-coupling interface 316 proximate to the first end 310 and configured to receive display light 318 from the display 304. At least a portion of the in-coupling interface 316 may be formed by substrate 320. The lightguide substrate 320 is composed of a material substantially transparent to the display light 318, such as glass, optical plastic, and the like. The lightguide substrate 320 includes two opposing major surfaces 322, 323 extending between the first end 310 and the second end 312 of the lightguide substrate 320, with the first major surface 322 being a surface oriented towards the wearer's eye (and thus also referred to herein as "eye-facing surface 322") and the second major surface 323 being a surface oriented away from the wearer's eye (and thus also referred to herein as "world-facing surface 323"). Either, or both, of the eye-facing surface 322 and the world-facing surface 323 can be freeform surfaces. Thus, the FLPG 302 can be integrated into lenses of eyeglasses used for vision correction.

The lightguide substrate 320 further includes opposing minor surfaces 324, 325. The first minor surface 324 is located at the first end 310 and disposed at an acute angle relative to the eye-facing surface 322 so as to form the in-coupling interface 316 having an optical axis that is not parallel to the major surfaces 322, 323. The second minor surface 325 is located at the second end 312 and can be disposed perpendicular to the major surfaces 322, 323 as shown, or disposed at a non-perpendicular angle relative to major surfaces 322, 323.

In one embodiment, the eye-facing surface 322 is overlaid with multiple layers of materials configured to change one or more polarization states of light as it traverses the material or to reflect light with a certain polarization state while transmitting light with a different polarization state (that is, to selectively allow the light to be transmitted through the layer to a subsequent layer or out of the lightguide). This collection of layers is referred to as a film stack 330. As further described below with reference to FIG. 4, in some embodiments, the film stack 330 includes a quarter-wave plate (QWP) layer 332, a polarization beam splitter (PBS) layer 334, and a linear polarizer (LP) layer 336. In order to prevent unwanted reflection of light from the eye-side, the film stack 330 further can include an anti-reflective (AR) layer 338 disposed between the expected position of a user's eye 314 and the other layers of the film stack 330. Each layer can be provided as a preformed film layer such that multiple films are overlaid onto each other to form the film stack, which is overlaid onto a surface of the lightguide substrate 320. Each layer instead can be provided as a coating deposited in sequence onto a surface of the lightguide substrate 320. Still further, in some embodiments, one or more of the layers are implemented as a preformed film layer while one or more other layers are implemented as a coating. Additionally, the FPLG 302 includes a partial mirror layer 328, or 50/50 mirror coating, disposed on the world-facing surface 323. The partial mirror layer 328 acts to reflect at least a portion of light incident on the world-facing surface 323, while allowing the remaining portion of the light to pass through the world-facing surface and out of the FPLG 302.

The FPLG 302 further includes an out-coupling region 326 to output a representation of the display light 318 reflected through the lightguide substrate 320 towards the wearer's eye. As used herein, the term "out-coupling region" can refer to a region of an eye-facing surface and overlying region of a film stack (such as the illustrated regions of eye-facing surface 322 and film stack 330) at which a representation of the display light 318 exits the FPLG 302 toward the wearer's eye.

Figure 4:
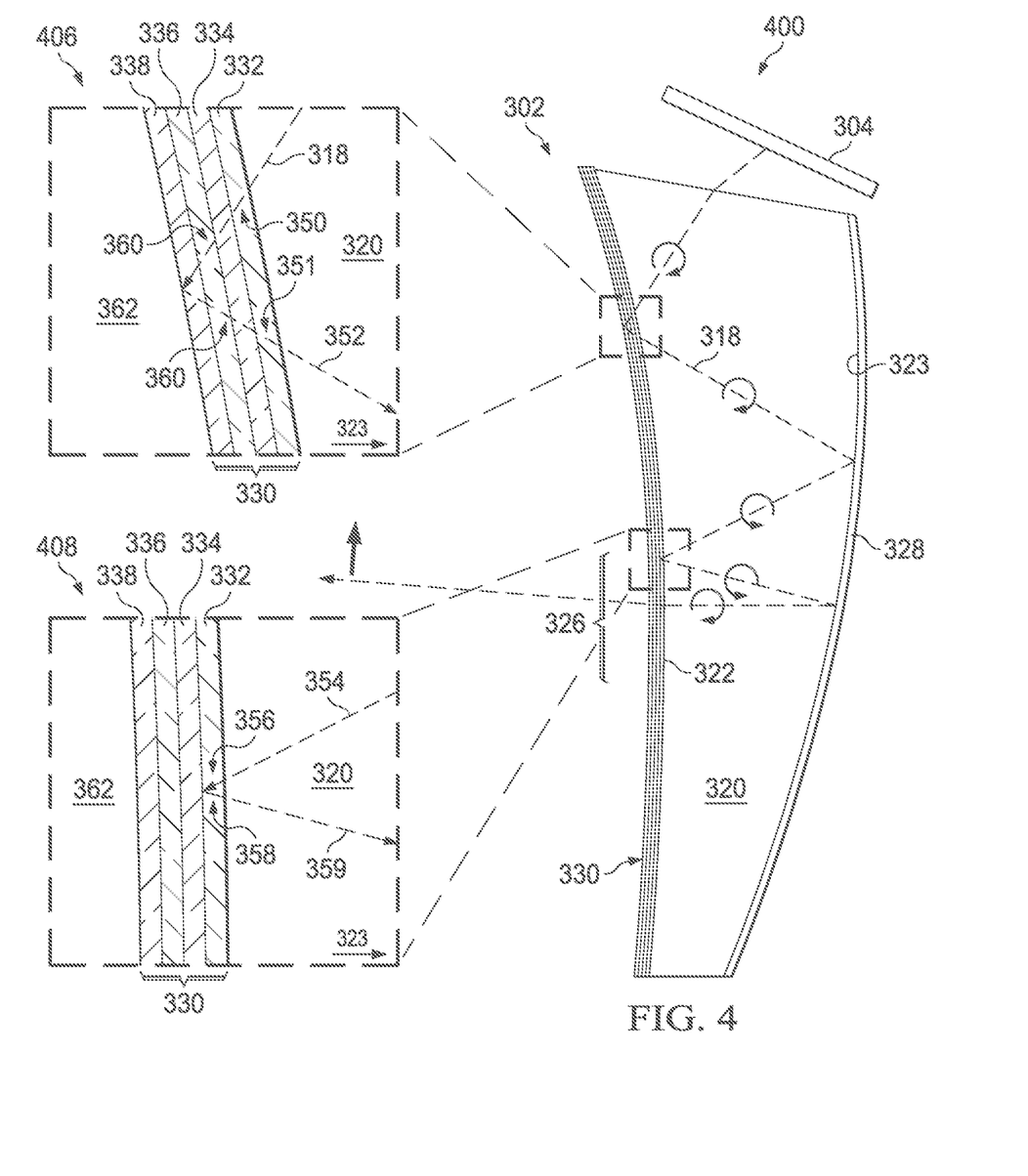
FIG. 4 is a cross-section view of a representation of the freeform polarization lightguide and associated display of FIG. 3 and various enlarged views of portions thereof in accordance with some embodiments.

FIG. 4 illustrates another cross-section view 400 of the FPLG 302 including additional detail on layers of the film stack 330 and an example transmission of display light through the FPLG 302 based on selective changes in the polarization state of in-coupled display light 318 and selective reflection of the in-coupled display light 318 based on its polarization state in accordance with at least one embodiment. For ease of illustration, the display light 318 is illustrated as a single ray in the operation described below. The film stack 330 is disposed on the eye-facing surface 322 of the FPLG 302 and includes a QWP layer 332 that is disposed overlying the eye-facing surface 322. In some embodiments, a PBS layer 334 is disposed overlying the QWP layer 332 such that the QWP layer 332 is adjacent to the eye-facing surface 322 and disposed between the PBS layer 334 and the eye-facing surface 322. The FPLG 302 further includes an LP layer 336 overlying the PBS layer 334 such that the PBS layer 334 is disposed between the QWP layer 332 and the LP layer 336. In order to prevent unwanted reflection of light from the eye-side, the LP layer 336 can be overlaid with an anti-reflective (AR) layer 338 such that the LP layer 336 is disposed between the AR layer 338 and the PBS layer 334. Each layer can be provided as a preformed film layer such that multiple films are overlaid onto each other to form the film stack, which is overlaid onto a surface of the lightguide substrate 320. Each layer instead can be provided as a coating deposited in sequence onto a surface of the lightguide substrate 320. Still further, in some embodiments, one or more of the layers are implemented as a preformed film layer while one or more other layers are implemented as a coating.

The QWP layer 332 is formed from a material or combination of materials that operate to convert light having a first circularly polarized state to light having a first linearly polarized state, and vice versa. The QWP layer 332 also operates to convert light having a second circularly polarized state to light having a second linearly polarized state, and vice versa. More generally, quarter-wave plates, such as the QWP layer 332 transmit light and modify its polarization state without deviating or displacing the beam. In a quarter-wave plate, the phase difference between the polarization component projected along the fast and slow axis is one-quarter wave. The QWP layer 332 can be implemented as, for example, multi-order, zero-order, or achromatic QWP layers. Examples of materials implementing the QWP layer 332 includes calcite or crystalline films, polychromatic films, and the like.

The PBS layer 334 is implemented using material that operates to transmit light having the first linearly polarized state and to reflect light having the second linearly polarized state. Examples include, but are not limited to, wire grid type PBS layers and dielectric coating type PBS layers. The LP layer 336 operates to reduce unwanted light transmitted by the PBS layer 334. The LP layer 336 is implemented using material that operates to transmit light having the second linearly polarized state. Examples include a wire grid polarizer, a calcite polarizer, or a dichroic polarizer. Further, the LP layer 336 reduces light that is reflected from the eye-side of the FPLG 302 into the user's eye, thereby reducing stray light and ghost images and, thus, improving image quality. The AR layer 438 disposed on the LP layer 336 also helps in reducing light that is reflected from the eye-facing surface 322 of the FPLG 302 into the user's eye further improving image quality.

The world-facing surface 323 of the FPLG 302 is configured as a continuous, or smooth, freeform surface to allow specular reflection of light propagating through the FPLG 302 when it encounters the world-facing surface 323. As the world-facing surface 323 is completely or partially covered by the partial mirror layer 328, display light propagating within the FPLG 302 is at least partially reflected from the world-facing surface 323. Light having the first circularly polarized state that encounters the partial mirror layer 328 at the world-facing surface 323 is converted to the second circularly polarized state and light having the first linearly polarized state that encounters the world-facing surface 323 is converted to the second linearly polarized state. Likewise, light having the second circularly polarized state that is incident upon the partial mirror layer 328 is converted to the first circularly polarized state and light having the second linearly polarized state that is incident upon the partial mirror layer 328 is converted to the first linearly polarized state.

With the described configuration, in an embodiment where display light 318 emitted from the display 304 enters the lightguide towards the eye-facing surface 322, the display light 318 is first subject to TIR and then to multiple changes in the polarization state as the display light 318 (or representations thereof) is reflected from or transmitted through the film layers of the film stack 330 and/or major surfaces 322, 323. To illustrate with reference to the enlarged inset view 406 depicted in FIG. 4, the display light 318 propagating within the lightguide substrate 320 having the first circularly polarized state is incident on the QWP layer 332 and is converted to light having the first linearly polarized state as the converted representation of the display light 318 propagates through the QWP layer 332. This converted light with the first linearly polarized state then encounters the overlying PBS layer 334, which is configured to transmit light having the first linearly polarized state, and thus transmits the light through to the LP layer 336. As the LP layer 336 is configured to transmit light having the first linearly polarized state, the incident light is 338 transmitted through the LP layer 336 and is subject to TIR from the boundary formed at the eye-side of the film stack 330 and the ambient medium. The reflected light then transmits back through the LP layer 336 and the PBS layer 334 to the QWP layer 332. As the transmitted light propagates through the QWP layer 332, the QWP layer 332 converts the polarization state of the light from the first linearly polarized state to the first circularly polarized state, such that the reflected light re-enters the lightguide substrate 320 having the first circularly polarized state. It will be appreciated that this initial reflection is dependent upon the angle at which the display light is incident on the film stack 330, and thus is a TIR-based reflection. However, subsequent reflections of light within the FPLG 302 are caused by interactions with certain of the layers in the film stack configured to reflect light of a particular polarization and are independent of the angle at which the light is incident upon the layers. Thus, the FPLG 302 utilizes both TIR and the polarization-state-based reflection property of the film stack 330 to "bound" display light along the length of the lightguide substrate 320, as described in detail below.

The representation of the display light reflected from the boundary formed at the eye-side of the film stack 330 and the ambient medium, having the first circularly polarized state after passing through the QWP layer 332, re-enters the lightguide substrate 320 and is transmitted to the world-facing surface 323. At the world-facing surface 323, the reflected light is converted from the first circularly polarized state to the second circularly polarized state as it is reflected from the partial mirror layer 328 back through the lightguide substrate 320 towards the film stack 330. The reflected light having the second circularly polarized state is converted to the second linearly polarized state as it propagates through the QWP layer 332 to the PBS layer 334. Because the PBS layer 334 is configured to reflect light having the second linearly polarized state, the light transmitted from the QWP layer 332 is reflected from the PBS layer 334, back through the QWP layer 332, where it is converted to the second circularly polarized state as the resulting representation of the display light 318 enters the lightguide substrate 320. The reflected light having the second circularly polarized state is propagated towards the world-facing surface 323, where it is converted to the first circularly polarized state as it is reflected from the partial mirror layer 328 back through the lightguide substrate 320 towards the film stack 330.

The light reflected from the world-facing surface 323 and having the first circularly polarized state is then incident on the QWP layer 332 and converted from the first circularly polarized state to the first linearly polarized state. Because the PBS and LP layers 334, 336 are configured to transmit light having the first linearly polarized state, the light transmitted from the QWP layer 332 is transmitted through the PBS and LP layers 334, 336 to the AR layer 338. Due to the non-parallel orientation of the eye-facing and world-facing surfaces 322, 323 of the FPLG 302, the angle of incidence upon the AR layer is less than the critical angle for TIR and at least some of the transmitted light from the LP layer 336 is propagated through the AR layer 338 to an out-coupling region 326 and out of the of the FPLG 302 towards the user's eye. This configuration allows light to exit the FPLG 302 despite its lack of any extraction components that would be used in conventional lightguides.

Figure 5:
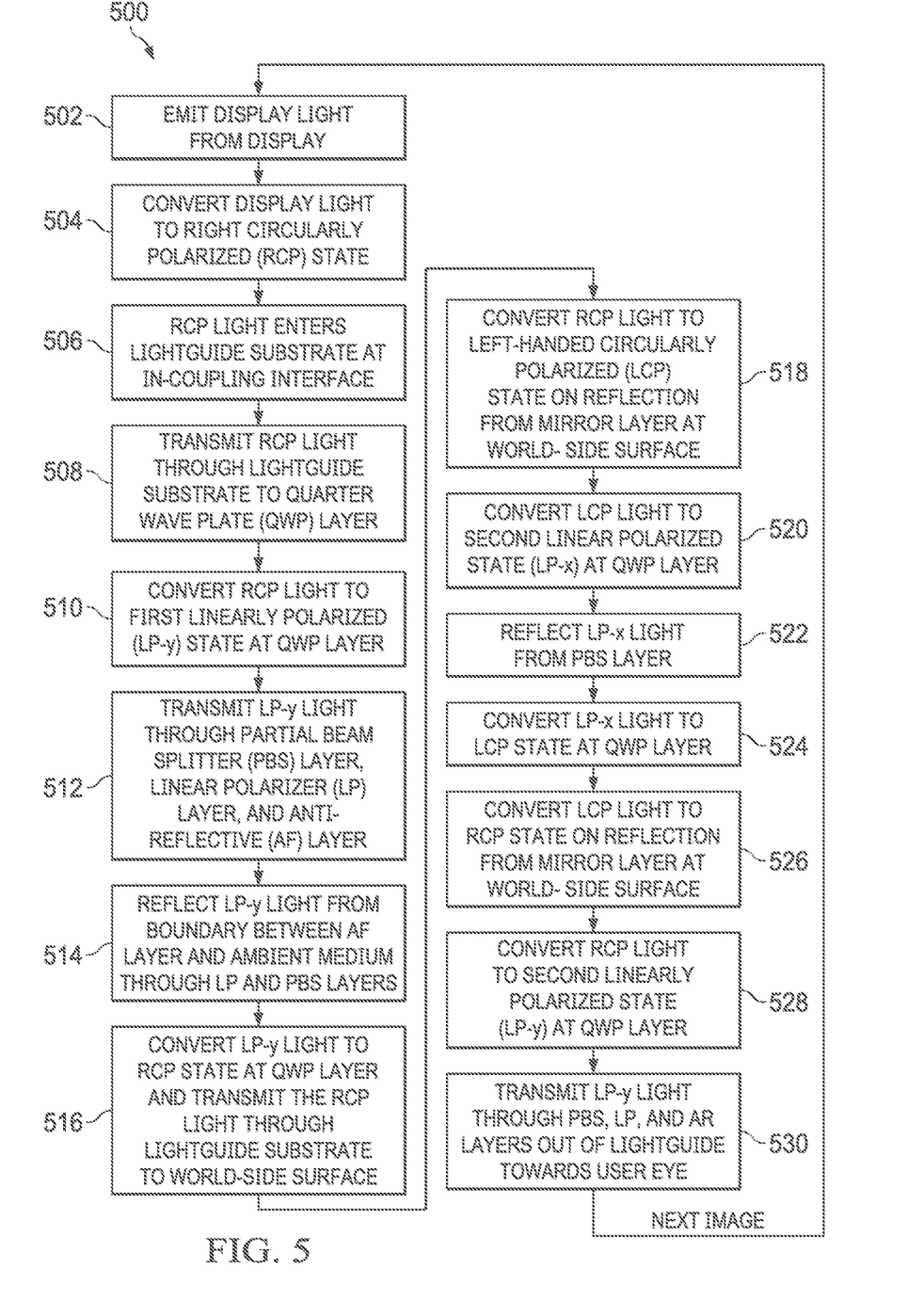
FIG. 5 is a flow diagram illustrating a method of employing a near-eye display system using the freeform polarization lightguide of FIG. 4 to display imagery to a user in accordance with some embodiments.

FIG. 5 is a flow diagram illustrating a method 500 of employing a near-eye display system with the freeform lightguide of FIG. 3, and further illustrated in FIG. 4, to display imagery to a user in accordance with at least one embodiment. The method 500 initiates at block 502 with the display 304 emitting display light 318, the display being oriented relative to the in-coupling interface 316 such that the emitted display light 318 is directed towards the film stack 330 disposed on the eye-facing surface 322 (i.e., the first major surface) of the FPLG 302. In the event that the provided display is configured to emit light in a left-handed circular polarization state, at block 504, a QWP layer can be provided between the display and the in-coupling interface to convert the display light to the RCP state before entering the lightguide substrate 320. The having the RCP state then enters into the lightguide substrate 320 of the FPLG 302 via the in-coupling interface 316 at block 506.

At block 508, the display light propagates through the lightguide substrate 320 at an angle relative to the eye-side surface such that when the display light encounters a boundary between two media, such as that between a film layer and air, the angle at which the light strikes the boundary is greater than or equal to the critical angle at which TIR occurs for the two media. As illustrated by enlarged inset view 406 of FIG. 4, on incident with the QWP layer 332, the resulting representation of the display light 318 having the RCP state is converted to light having a linear y-polarization 350, at block 510. Because the PBS 334, LP 336, and AR 338 layers of the film stack 330 are configured to transmit light having linear y-polarization, the converted light is propagated through the PBS, LP, and AR layers to the boundary between the AR layer 338 and the ambient medium 362 on the eye-facing surface 322 side of the FPLG 302, at block 512. Because the transmitted light strikes the boundary at an angle 360 that is greater than or equal to the critical angle for the AR layer 338 material and the air, the converted light 350 will TIR from the boundary, back through the PBS 334, LP 336, and AR 338 layers, to the QWP layer 332 at block 514. On incident with the QWP layer 332, the reflected light 351 having the linear y-polarization state is converted to light having the RCP state 352, at block 516, as it is transmitted towards the world-facing surface 323 of the FPLG 402.

At the world-facing surface 323, the transmitted light 352 is converted from the RCP state to light having the LCP state 354 (block 518) as the transmitted light 352 is reflected from the partial mirror layer 328. The resulting representation of the display light having the LCP state is transmitted from the world-facing surface 323 back towards the QWP layer 332 of the film stack 330 disposed on the eye-facing surface 322. As illustrated by enlarged inset view 408 of FIG. 4, the reflected light propagates through the QWP layer 332 and is converted to a linearly x-polarized state 356 at block 520. The resulting modified light 356 then encounters the PBS layer 334, and because the PBS layer 334 is configured to reflect light having the linearly x-polarized state, the PBS layer 334 reflects the modified light 356 back to the QWP layer 332 (block 522).

As the reflected light 358 propagates through the QWP layer 332, the QWP layer 332 converts the reflected light 358 from the linear x-polarized state back to light having the LCP state 359 (block 524) before the light 359 enters the lightguide substrate 320. As represented by block 526, the reflected light having an LCP state 358 is incident on the world-facing surface 323 and converted to the original RCP state as it is reflected from the partial mirror layer 328 into the lightguide substrate 320 towards the eye-facing surface 322. At block 528, the reflected light having the RCP state is converted to the linearly y-polarized state upon incident with the QWP layer 332. Because the PBS 334, LP 336, and AR 338 layers are configured to transmit light having linear y-polarization, the converted light propagates through the PBS 334, LP 336, and AR 338 layers to the boundary between the AR layer 338 and the air on the eye-side of the FPLG 302 at block 530. However, because the transmitted light is not incident on the boundary at an angle equal to or greater than the critical angle, the transmitted linear y-polarized light is not reflected at the boundary, and instead is transmitted towards the region corresponding to the out-coupling region 326 of the FPLG 302 and towards the user's eye. The method can be repeated for each image projected by the display.

The internal reflections within the FPLG 302 represented by blocks 518-526 result from manipulation of the polarization state of the conveyed representation of the display light 318 in view of the polarization-state-specific reflection and transmission properties of the stack of material layers overlying the major surfaces 322, 323 of the lightguide substrate 320, and do not rely on TIR. Thus, the lightguide substrate 320 can be composed of a material with a lower index of refraction, such as an optical plastic, than the lightguide material conventionally used in TIR-based lightguides (e.g., relatively heavy and expensive optical glass) to achieve a given FOV. Alternatively, a greater FOV can be achieved by the FPLG 302 by using a material with the same index of refraction as a corresponding TIR-based lightguide. Moreover, because TIR is not required, the lightguide substrate can employ at least one freeform major surfaces, which typically is impracticable to implement in a conventional TIR-based lightguide.

Figure 6:
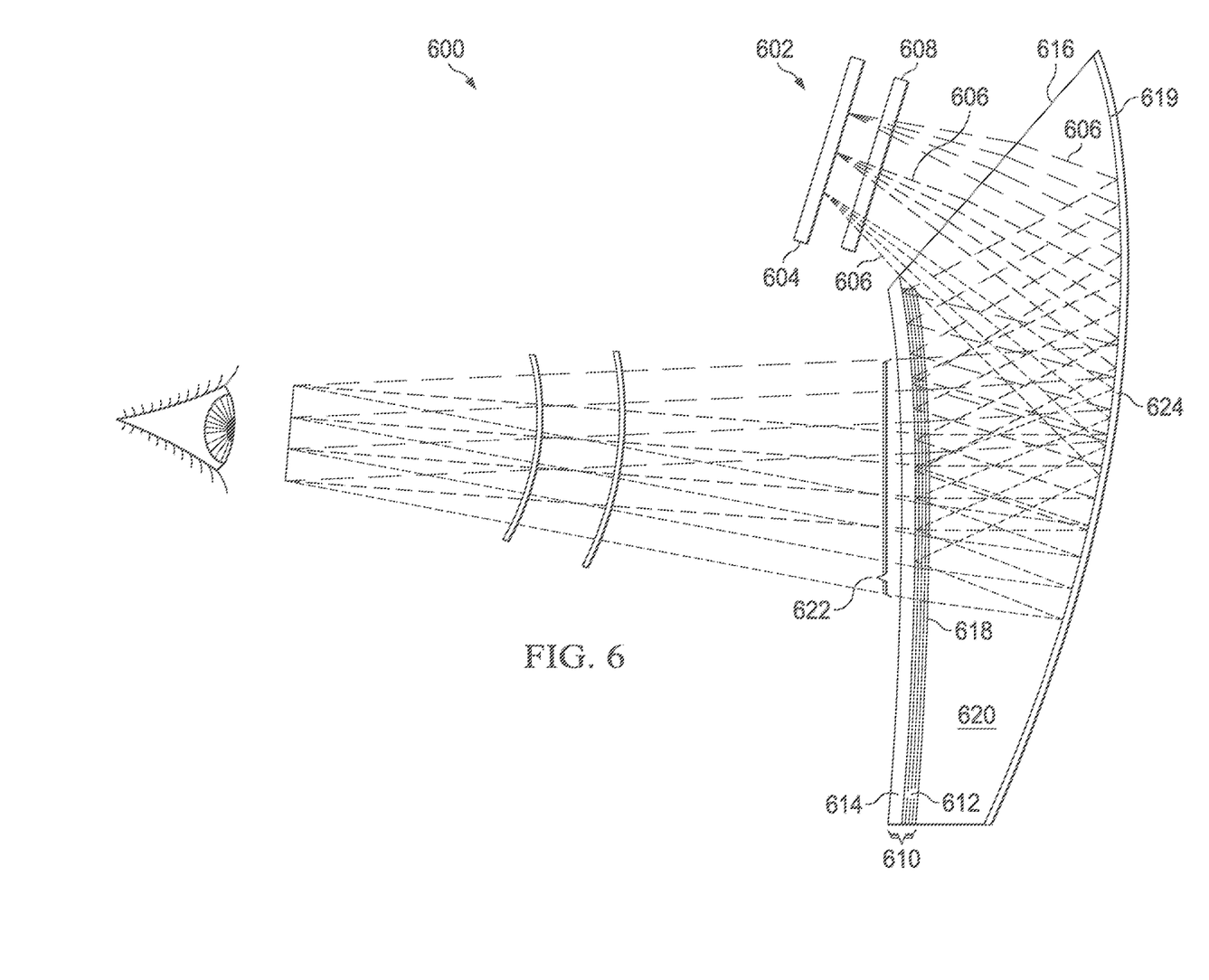
FIG. 6 is a cross-section view of another freeform polarization lightguide with associated display in accordance with some embodiments.

FIG. 6 illustrates a cross-section 600 of another embodiment of an FPLG 602 in accordance with some embodiments. The FPLG 602 formed of a lightguide substrate 620 (or comprising the substrate 620) includes a display 604 oriented to direct display light 606 emitted from the display 604 towards an in-coupling interface 616. The FPLG 602 (i.e. the apparatus or system the FPLG 602 forms part of) can also include a display quarter-wave plate 608 disposed between the display and the in-coupling interface 616 to convert display light having a linearly polarized state to light having a circularly polarized state. The in-coupling interface 616 is disposed at an acute angle relative to the world-facing surface 619 of the FPLG 602 such that display light 606 from the display 604 entering into the FPLG 602 at the in-coupling interface 616 is directed to the word-facing surface 619. Disposed at the world-facing surface 619 is a partial mirror layer 624, or 50/50 mirror coating. The partial mirror layer 624 acts to reflect at least a portion of light incident on the world-facing surface 619, while allowing the remaining portion of the light to pass through the world-facing surface 619 and out of the FPLG 602.

Opposing the world-facing surface 619 is an eye-facing surface 618 located on the eye-facing side of the FPLG 602. A film stack 610 is disposed on the eye-facing surface 618 of the FPLG 602 and includes a QWP layer 612 and a PBS layer 614. Either, or both, of the eye-facing surface 618 and the world-facing surface 619 can be freeform surfaces capable of incorporating prescription optical correction of world-side light as it passes through the FPLG 602 to a user's eye. Thus, the FLPG 602 can be integrated into lenses of eyeglasses used for vision correction by a user.

Light that is directed into the FPLG 602 is subject to multiple reflections and changes in polarization state before being directed towards an out-coupling region 622 region at the eye-facing side of the FPLG 602. The out-coupling region 622 is generally disposed at a region of the FPLG 602 where a user's eye is expected to be positioned and such that light exiting the FPLG 602 at the out-coupling region 622 is directed towards the user's eye.

With the described configuration, light 606 emitted from the display 604 is first directed to the world-facing surface 619 of the FPLG 602 and then subject to changes in polarization state as it is reflected from or transmitted through the layers of the film stack 610 and/or major surfaces 618, 619. If the display 604 is configured to emit light having a first linearly polarized state, the display quarter-wave plate 608 converts the display light 606 to a first circularly polarized state before it enters the FPLG 602 at the in-coupling interface 616. The resulting representation of the display light 606 propagating within the lightguide substrate 620 having a first circularly polarized state is then incident on the world-facing surface 619 and is converted to the second circularly polarized state as it is reflected from the partial mirror layer 624 towards the film stack 610.

The representation of the display light reflected from the world-facing surface 619 having the second circularly polarized state is converted to the second linearly polarized state as it propagates through the QWP layer 612 to the PBS layer 614. Because the PBS layer 614 is configured to reflect light having the second linearly polarized state, the light transmitted from the QWP layer 612 is reflected from the PBS layer 614, back through the QWP layer 612, where it is converted to the second circularly polarized state as it enters the lightguide substrate 620. The reflected light having the second circularly polarized state is propagated towards the world-facing surface 619, where it is converted to the first circularly polarized state as it is reflected back through the lightguide substrate 620 towards the film stack 610.

The light reflected from the partial mirror layer 624, disposed at the world-facing surface 619, having the first circularly polarized state is incident on the QWP layer 612 of the film stack 610 and converted from the first circularly polarized state to the first linearly polarized state. As the PBS layer 614 is configured to transmit light having the first linearly polarized state, the light transmitted from the QWP layer 612 is transmitted through the PBS layer 614 to the out-coupling region 622 and out of the lightguide towards the user's eye.

Figure 7:
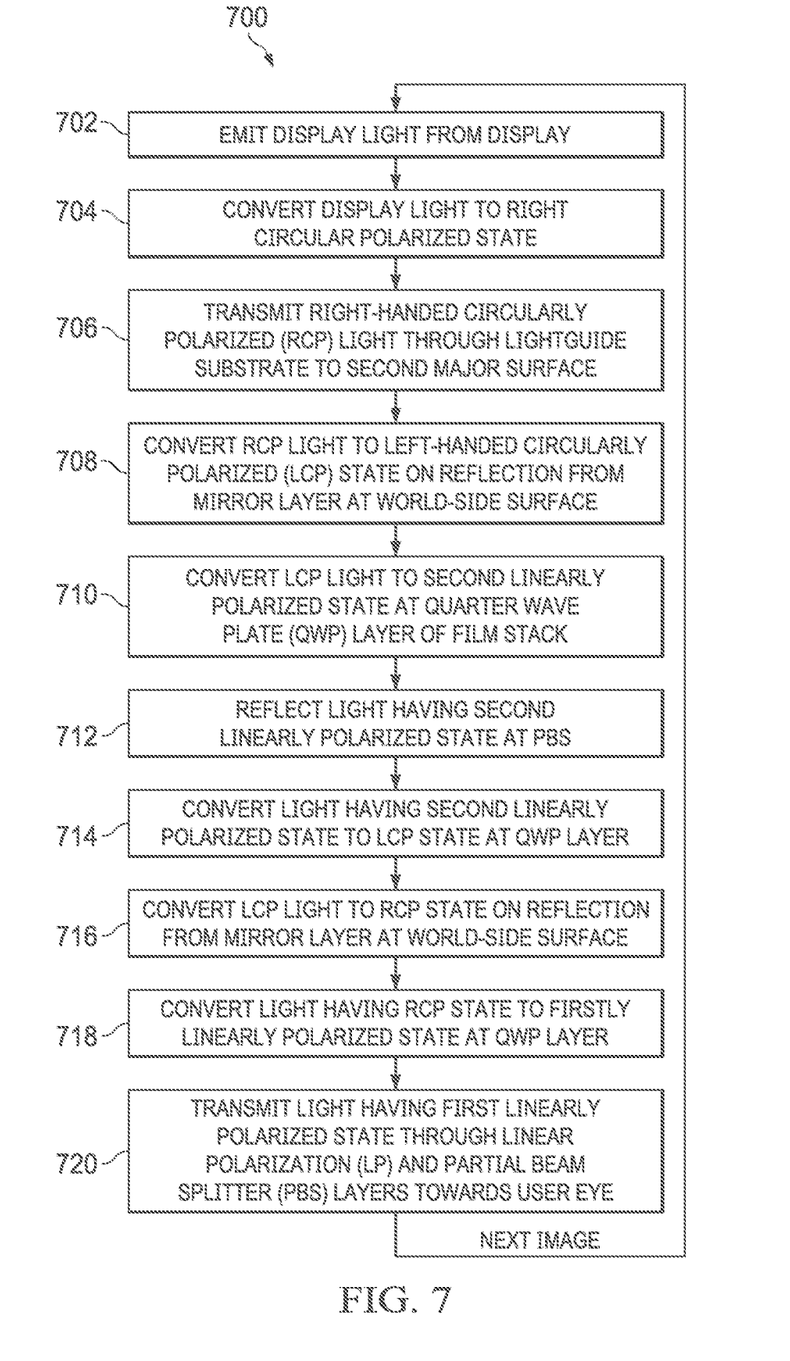
FIG. 7 is a flow diagram illustrating a method of employing a near-eye display system using the freeform polarization lightguide of FIG. 6 to display imagery to a user in accordance with some embodiments.

FIG. 7 is a flow diagram illustrating a method 700 of employing a near-eye display system with the freeform lightguide of FIG. 6 to display imagery to a user in accordance with at least one embodiment. The method 700 initiates at block 702 with the display 604 emitting a display light 606 representative of a display image, which can include AR or VR content. For purposes of illustration, the first circularly polarized state is the right-handed circularly polarized (RCP) state. However, if the provided display 604 is configured to emit light in a left-handed circularly polarized (LCP) state, a quarter-wave plate can be provided between the display 604 and the in-coupling interface 616 to convert the emitted light to the RCP state before entering the lightguide substrate at block 704. At block 706, the display light 606 having the RCP state enters into the lightguide substrate 620 of the FPLG 602 via the in-coupling interface 616.

The representation of the display light having the RCP state propagates through the lightguide substrate 620 at an angle and thus strikes the world-facing surface 619 (i.e., the second major surface). At the world-facing surface 619, the transmitted light is converted to the LCP state (block 708) as it is reflected from the partial mirror layer 624. The LCP state light is transmitted from the world-facing surface 619 towards the QWP layer 612 of the film stack 610 disposed on the eye-facing surface 618 (i.e., the eye-facing surface). As the reflected light propagates through the QWP layer 612, the QWP layer 612 changes the polarization state of the light to the second linearly polarized state (block 710), which for purposes of example is described herein as the linearly x-polarized state. The modified light having the linearly x-polarized state then encounters the PBS layer 614, and as the PBS layer 614 is configured to reflect light having a linearly x-polarized state, the PBS layer 614 reflects the modified light back to the QWP layer 612 (block 712).

As the modified light propagates through the QWP layer 612, the QWP layer 612 converts the light from the linear x-polarized state back to the LCP state (block 714) such that the modified light re-enters the lightguide substrate 620 as reflected light having an LCP state. As represented by block 716, the reflected light having the LCP state is incident on the world-facing surface 619 and converted to the original RCP state as it is reflected from the partial mirror layer 624 into the lightguide substrate 620 towards the eye-facing surface 618. At block 718, the reflected light having the RCP state is converted to a first linearly polarized state upon incident with the QWP layer 612. For purposes of example, the first linearly polarized state is described herein as a linearly y-polarized state. As the PBS layer 414 is configured to transmit light having a linearly y-polarized state, the modified light is propagated through the PBS layer 614 and out of the FPLG 602 towards a user's eye at block 720. The method can be repeated for each image projected by the display.

The internal reflections within the FPLG 602 represented by blocks 708-716 result from manipulation of the polarization state of the representation of the display light 606 in view of the polarization-state-specific reflection and transmission properties of the stack of material layers overlying the major surfaces 618, 619 of the lightguide substrate 620, and do not rely on TIR. Thus, the lightguide substrate 620 can be composed of a material with a lower index of refraction, such as an optical plastic, than the lightguide material conventionally used in TIR-based lightguides. Additionally, a greater FOV can be achieved by the FPLG 602 by using a material with the same index of refraction as a corresponding TIR-based lightguide. Moreover, because TIR is not required, the lightguide substrate can employ at least one freeform major surface.

Figure 8:
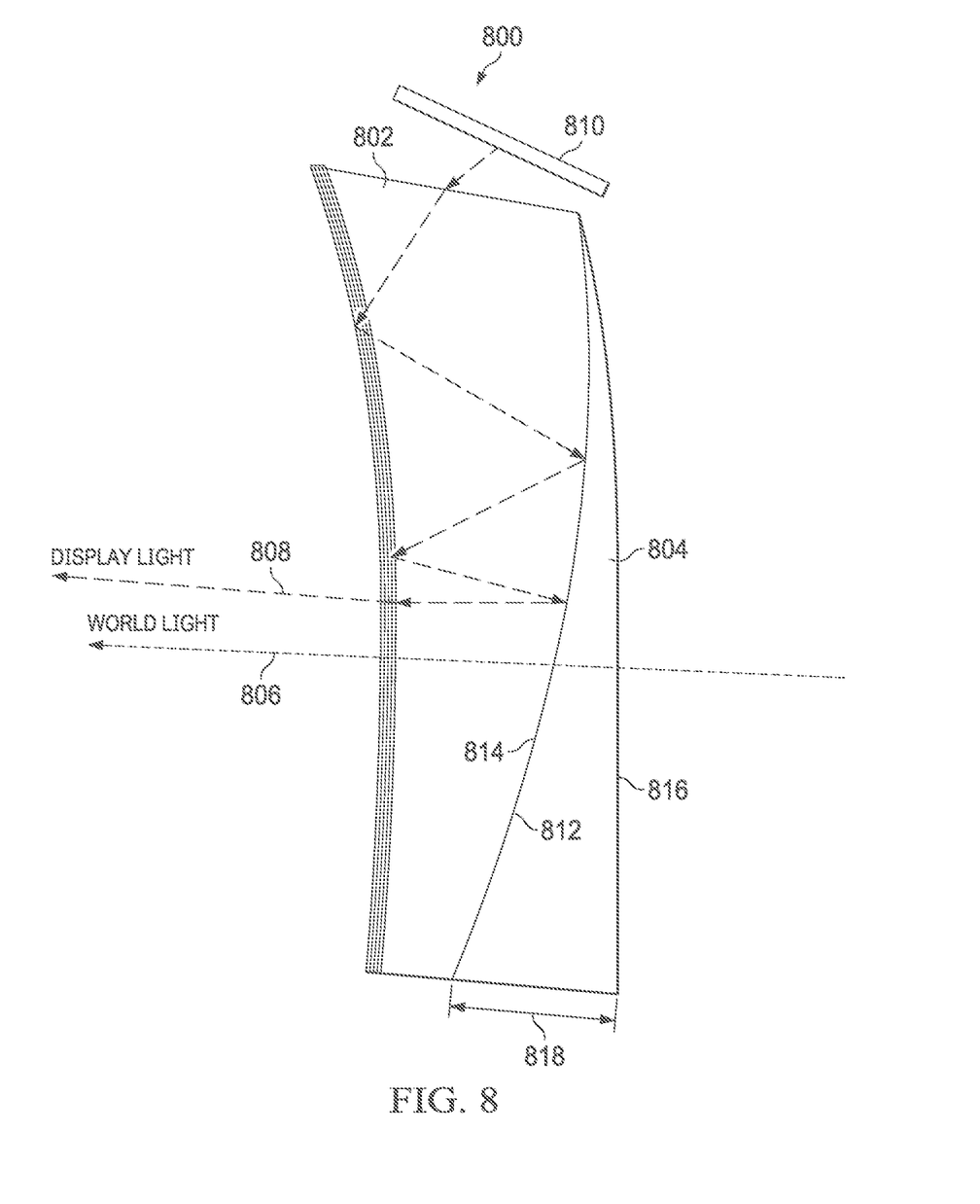
FIG. 8 is a cross-section view of another freeform polarization lightguide and associated compensation optic in accordance with some embodiments.

FIG. 8 illustrates a cross-section 800 of an FPLG 802 that employs a transparent compensation optic 804 in accordance with at least one embodiment. The FPLG 802 represents, for example, the FPLG 302 illustrated in FIGS. 3 and 4 or, in other embodiments, the FPLG 802 represents the FPLG 602 of FIG. 6. The compensation optic 804 is composed of a transparent material having properties allowing transmission of world light 806 through the compensation optic 804 with minimal diffraction and/or reflection. This allows a user wearing a near-eye display system, such as, for example, the near-eye display system 200 illustrated in FIG. 2 implementing the FPLG 802, to view their environment in addition to the representation of the display light 808 emitted from the display 810. The eye-facing surface 812 of the compensation optic 804 has a freeform curvature that is complementary to the world-facing surface 814 of the FPLG 802 and the profile width 818 of the compensation optic can vary such that the world-facing surface 816 of the compensation optic is parallel or near parallel to the eye-facing surface of the FPLG 802. This allows the combined FPLG 802 and compensation optic 804 to be secured within an eyeglass frame, such as the eyeglass frame 204 of FIG. 2. Furthermore, the world-facing surface 816 of the compensation optic can be a surface capable of incorporating prescription optical correction of world-side light for a user.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
    a freeform lightguide comprising:
        a lightguide substrate comprising a first surface and a second surface opposing the first surface, wherein the first surface and the second surface extend between a first end and a second end of the freeform lightguide, wherein at least the second surface is a freeform surface;
        an in-coupling interface configured to receive display light at the first end of the lightguide substrate;
        a quarter-wave plate layer overlying the first surface of the lightguide substrate; and
        a polarization beam splitter layer overlying the quarter-wave plate layer.

2. The apparatus of claim 1, further comprising:
    a display configured to emit the display light toward the in-coupling interface of the lightguide substrate.

3. The apparatus of claim 1, wherein the freeform lightguide is integrated into a lens of an augmented reality near-eye display system.

4. The apparatus of claim 2, wherein:
    the display is configured to emit the display light having a first circularly polarized state;
    the quarter-wave plate layer is configured to convert incident light having first circularly polarized state to light having a first linearly polarized state, to convert incident light having the first linearly polarized state to light having the first circularly polarized state, and to convert incident light having a second circularly polarized state to a second linearly polarized state; and
    the polarization beam splitter layer is configured to transmit light having the first linearly polarized state and to reflect light having the second linearly polarized state.

5. The apparatus of claim 1, further comprising:
    an eyeglass frame comprising an eyeglass lens; and
    wherein the eyeglass lens implements the freeform lightguide and an out-coupling region disposed at or adjacent to an eye-ward surface of the eyeglass lens.

6. The apparatus of claim 1, wherein the freeform lightguide further comprises:
    a linear polarization layer overlying the polarization beam splitter layer; and
    an anti-reflective layer overlying the linear polarization layer.

7. The apparatus of claim 2, further comprising:
    a display quarter-wave plate disposed between the display and in-coupling interface and configured to convert the display light emitted from the display from a linearly polarized state to a circularly polarized state.

8. The apparatus of claim 1, further comprising a partial mirror layer overlying the second surface, wherein the partial mirror layer is configured to:
    convert reflected incident light having a first circularly polarized state to light having a second circularly polarized state; and
    convert reflected incident light having the second circularly polarized state to light having the first circularly polarized state.

9. The apparatus of claim 1, further comprising:
    a compensation optic disposed at the second surface of the freeform lightguide.

10. A method comprising:
    providing a freeform lightguide comprising a lightguide substrate comprising a first surface and a second surface extending between a first end and a second end, an in-coupling interface at the first end, a quarter-wave plate layer overlying the first surface, and a polarization beam splitter layer overlying quarter-wave plate layer, wherein at least the second surface comprises a freeform surface;
    directing display light emitted by a display to the in-coupling interface;
    conveying a representation of the display light through the freeform lightguide from the in-coupling interface to an out-coupling region; and
    transmitting the representation of the display light from the out-coupling region.

11. The method of claim 10, wherein the freeform lightguide further comprises a linear polarization layer overlying the polarization beam splitter layer.

12. The method of claim 11, wherein conveying the representation of the display light through the freeform lightguide comprises:
    causing a first change to a polarization state of the display light such that the display light is reflected by the polarization beam splitter layer; and
    causing a second change to the polarization state of the reflected display light such that the display light passes through the quarter-wave plate layer, the polarization beam splitter layer, and the linear polarization layer, to the out-coupling region.

13. The method of claim 11, wherein conveying the representation of the display light through the freeform lightguide comprises at least one of the steps of:
    conveying the display light having a first circularly polarized state from the in-coupling interface to the quarter-wave plate layer;
    converting the representation of the display light to a first linearly polarized state at the quarter-wave plate layer;
    reflecting the representation of the display light having the first linearly polarized state from the first surface of the freeform lightguide toward the quarter-wave plate layer; and
    converting the reflected representation of the display light from the first linearly polarized state to the first circularly polarized state at the quarter-wave plate layer.

14. The method of claim 13, wherein conveying the representation of the display light through the freeform lightguide further comprises at least one of the steps of:
    conveying the representation of the display light having the first circularly polarized state from the quarter-wave plate layer to the second surface;
    reflecting the representation of the display light from a partial mirror layer at the second surface such that the first circularly polarized state is converted to a second circularly polarized state;
    conveying the representation of the display light having the second circularly polarized state to the quarter-wave plate layer;
    converting the representation of the display light having the second circularly polarized state to a second linearly polarized state at the quarter-wave plate layer;

conveying the representation of the display light having the second linearly polarized state to the polarization beam splitter layer; and reflecting the representation of the display light having the second linearly polarized state from the polarization beam splitter layer.

15. The method of claim 14, wherein conveying the representation of the display light through the freeform lightguide further comprises at least one of the steps of:

conveying the representation of the display light having the second linearly polarized state from the polarization beam splitter layer to the quarter-wave plate layer;

converting the representation of the display light having the second linearly polarized state to the second circularly polarized state at the quarter-wave plate layer;

conveying the representation of the display light having the second circularly polarized state to the second surface;

reflecting the representation of the display light having the second circularly polarized state from the partial mirror layer such that the display light is converted to the first circularly polarized state; and conveying the representation of the display light having the first circularly polarized state through the quarter-wave plate layer, the polarization beam splitter layer, and the linear polarization layer, to the out-coupling region.

16. A near-eye display system comprising:

a freeform lightguide having an in-coupling interface at a first end and having an out-coupling region at a first surface, wherein the first surface and a second surface opposing the first surface extend between the first end and a second end of the freeform lightguide, the freeform lightguide configured to convey light incident at the in-coupling interface to the out-coupling region by inducing at least one change in a linearly polarized state of the light and at least one change in a circularly polarized state of the light as the light traverses the freeform lightguide using a film stack disposed at the first surface facing an expected position of a wearer's eye and the second surface, wherein one or more of the changes in polarization states induce the light to reflect within the freeform lightguide.

17. The near-eye display system of claim 16, wherein one or more of the changes in polarization states induce the light to reflect from a polarization beam splitter layer within the freeform lightguide.

18. The near-eye display system of claim 16, wherein the film stack comprises:

a quarter-wave plate layer; and a polarization beam splitter layer.

19. The near-eye display system of claim 18, wherein the film stack further comprises:

a linear polarization layer; and an anti-reflective layer.

20. The near-eye display system of claim 16, wherein one or more of the changes in polarization states induce the light to pass through the film stack to the out-coupling region towards a user's eye.

* * * * *